INVENTOR.
PERCY L. SPENCER,
BY Elmer J. Gorn
ATTY.

Patented Jan. 25, 1949

2,459,847

UNITED STATES PATENT OFFICE 2,459,847

ELECTRIC FLASH PERCUSSIVE WELDING

Percy L. Spencer, West Newton, Mass., assignor to Raytheon Manufacturing Company, Newton, Mass., a corporation of Delaware Application June 14, 1945, Serial No. 599,405

4 Claims. (Cl. 219—4)

This invention relates to electric welding, and more particularly to electric flash percussive welding.

In welding systems of the type to which the invention relates, one of the work pieces to be welded is connected to one terminal of a high voltage source, and the other work piece is connected to the other terminal of said source. The work pieces are then brought together under impact, and as the same approach each other and before physical contact is made, the voltage is sufficiently high to cause an arc across the intervening gap, so that the surfaces of the metal are molten before the impact takes place. In such systems a portion of the energy supplied to the work pieces is lost in the gap during the arc discharge. Since the length of this gap is dependent upon the applied voltage, the losses in the gap increase as the applied voltage increases. Thus, as the area of the two work pieces at which the weld is to be effected increases and a correspondingly higher voltage is required to effect the necessary softening of the juxtaposed surfaces, the energy losses in the gap increase sharply.

It is among the objects of the present invention to provide a system of the type described in which the distance between the two work pieces at which arcing occurs at a given voltage is substantially reduced. Accordingly, the energy losses in the gap are substantially reduced, or the potential applied to the work pieces may be substantially increased without increasing the energy losses in the gap.

Figure 1:
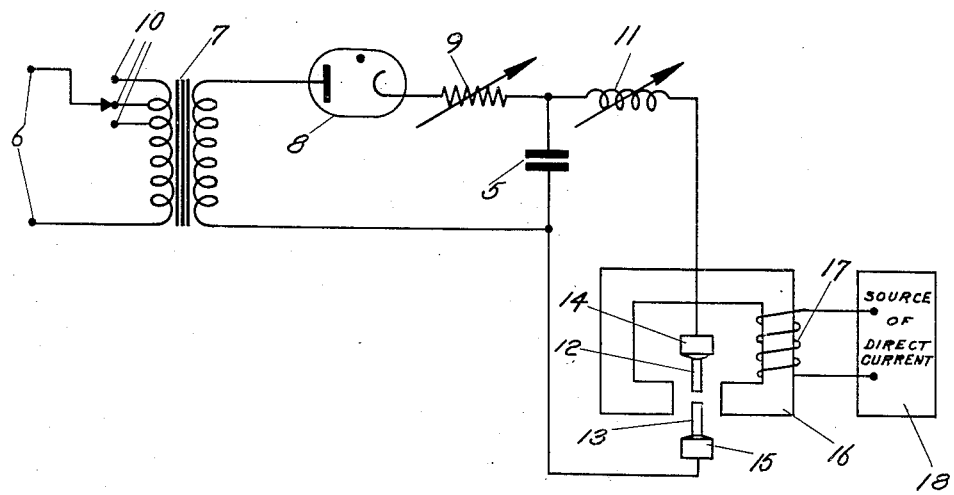
Figure 2:
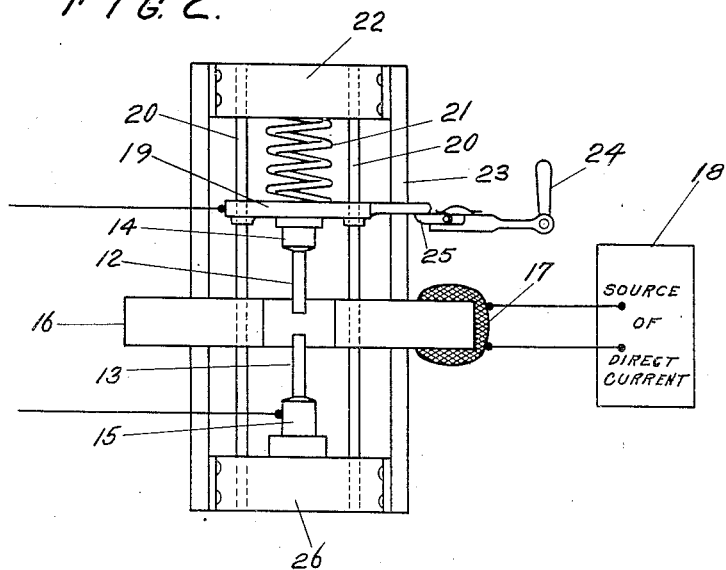

The means and mode of attainment of the foregoing and other objects and features of the invention will be made fully apparent to those skilled in the art from a consideration of the following detailed description, taken in conjunction with the accompanying drawing, in which:

Fig. 1 shows a wiring diagram of a welding circuit constructed in accordance with the present invention; and Fig. 2 shows in side elevation a welding apparatus suitable for use in the practice of the present invention.

Referring to the drawing, reference numeral 5 indicates a storage condenser or a bank of such condensers adapted to be charged from a suitable source of alternating current 6, such as a commercial supply line, the voltage of which is stepped up by a transformer 7 and rectified by a suitable gaseous discharge tube 8. Preferably, a variable resistor 9 is provided between the condenser 5 and the rectifier 8, which resistor controls the charging rate of the condenser 5. In order to vary the potential to which the condenser 5 may be charged, one or the other of the windings of transformer 7, in this instance the primary winding, is provided with a plurality of taps 10 to which the line 6 may be selectively connected in order to vary the turn ratio of the transformer and thereby vary the voltage of the output thereof. One of the terminals of the condenser 5 is connected through a variable inductance 11 to one of the work pieces 12, and the other terminal of the condenser is connected to the other of the work pieces 13. The two work pieces 12 and 13 are normally held in spaced relation in chucks 14 and 15. Initially, the distance between the juxtaposed surfaces of the two work pieces 12 and 13 is sufficiently great to prevent an arc from occurring across the intervening space at the potential to which the condenser 5 is charged. As the two work pieces are moved into contact at a velocity sufficient to produce the desired impact, the gap therebetween becomes sufficiently small so that an arc flashes across the gap between the two work pieces. In order to reduce the distance at which such an arc will normally occur between the two work pieces at any given potential on the condenser 5, I provide a magnetic field extending transversely to the lines of current flow in the arc. To this end I provide an electromagnet 16 having a coil 17, the terminals of which are connected to a suitable source of direct current 18. The two poles of the electromagnet 16 provide a magnetic field coextensive with the maximum distance between the two work pieces 12 and 13 so that the lines of the electromagnetic force extend transversely to the lines of the electrostatic force between the two work pieces.

An apparatus for carrying out the process of the present invention is shown in Fig. 2. Referring to this figure, the chuck 14 holding the work piece 12 is mounted upon a movable member 19. The member 19 is slidable on guide rods 20 and is adapted to be actuated by a spring 21, bearing at one end upon the member 19 and at its opposite end against a fixed member 22 mounted upon a supporting frame 23. The spring 21 is adapted to be compressed by a lever 24 having a spring-pressed pawl 25 adapted to engage a projecting finger on the member 19. The chuck 15 for holding the work piece 13 is mounted upon a supporting base 26 mounted on the frame 23. The electromagnet 16 is also supported by the frame 23 at a point intermediate the length thereof and with its pole pieces coextensive with the gap between the end faces of the work pieces 12 and 13. It will be understood that one or the other of the chucks 14 and 15 is suitably insulated from the supporting structure.

In operation, assuming that the condenser 5 has been charged, the work pieces 12 and 13 are normally held in the spaced position shown, at which distance the applied potential is insufficient to cause an arc therebetween. By actuating the lever 24, the pawl 25 slips over the projection on the member 19 and permits the spring 21 to drive the work piece 12 downwardly toward the work piece 13. At some point in the movement of the work piece 12 toward the work piece 13, the applied voltage becomes sufficient to cause an arc discharge between the two work pieces. If no magnetic field were provided across this space in a direction transverse to the electric field between the juxtaposed faces of the two work pieces, such arcing would occur while the two work pieces are relatively far apart.

The magnetic field has the effect of preventing the arc from being initiated until the two work pieces are much closer together than they would be if no such field were provided, and assuming the same voltage is applied. Thus, at the instant when the current resulting from the discharge of the condenser 5 is at its highest intensity, the two work pieces are relatively close together. Both the space in which and the time during which radiation and other losses can occur are substantially reduced.

While the utility of the invention is not necessarily limited to a system in which the arc discharge is oscillatory, since the method and apparatus described will reduce the energy losses in the gap regardless of the nature of the discharge, it will be understood that an oscillatory discharge of high frequency, 1000 cycles per second or more, is commonly desired in the art of flash percussive welding. The frequency utilized is limited by the fact that it should not be so high that the wave train has decayed before the parts can be brought together. The present invention has special utility in systems using an oscillatory discharge, since such discharge is normally of decreasing amplitude. The work pieces are the farthest apart at the time when the discharge is at its highest intensity. By providing a system in which the initiation of the arc is prevented until the parts are closer together than has heretofore been possible, the energy of the most intense portion of the wave train is conserved. Also the duration of the discharge, for a given velocity at impact, is reduced, and accordingly a higher frequency may be utilized.

Although there has been herein described a preferred embodiment of the invention, other embodiments within the scope of the appended claims will be obvious to those skilled in the art from a consideration of the form shown and the teachings hereof. Accordingly, a broad interpretation of the claims, commensurate with the scope of the invention within the art, is desired.

What is claimed is:

1. The method of electrically welding two metallic parts which comprises moving said parts from a separated position toward each other, impinging one of said parts upon the other, impressing a voltage between said parts sufficient to provide an arc between said parts when a short distance apart whereby an arc is established between said parts as the same approach contacting relation, and maintaining a unidirectional magnetic field across the space between said parts with the lines of force of said magnetic field directed transversely to the lines of electrostatic force between said parts, whereby said arc is provided at a shorter distance than in the absence of said magnetic field.

2. An apparatus for electric percussion welding comprising a fixed member for mounting a work piece providing a first electrode, a movable member for mounting a second work piece providing a second electrode, means for actuating said movable member to impinge said second electrode against said first electrode, means for establishing an electrostatic field between said work pieces sufficient to provide an arc therebetween as the same approach contacting relation, and means for maintaining a magnetic field in the space between said electrodes and extending transverse to said electrostatic field to reduce the distance between said electrodes at which said arc is established.

3. An apparatus for electric percussion welding comprising a fixed member for mounting a work piece providing a first electrode, a movable member for mounting a second work piece providing a second electrode, means for actuating said movable member to impinge said second electrode against said first electrode, a storage condenser for establishing an electrostatic field between said work pieces sufficient to provide an arc therebetween as the same approach contacting relation, and means for maintaining a magnetic field in the space between said electrodes and extending transverse to said electrostatic field to reduce the distance between said electrodes at which said arc is established.

4. An apparatus for electric percussion welding comprising mounting means for mounting a work piece providing a first electrode, mounting means for mounting a second work piece providing a second electrode, means for moving said mounting means toward each other to impinge said electrodes against each other, means for establishing an electrostatic field between said work pieces sufficient to provide an arc therebetween as the same approach contacting relation, and means for maintaining a magnetic field in the space between said electrodes and extending transverse to said electrostatic field to reduce the distance between said electrodes at which said arc is established.

PERCY L. SPENCER.

REFERENCES CITED

The following references are of record in the file of this patent:

UNITED STATES PATENTS

| Number | Name | Date |
|---|---|---|
| 1,066,468 | Chubb | July 8, 1913 |
| 2,286,210 | Klemperer et al. | June 16, 1942 |